United States Patent [19]
Zanetti

[11] Patent Number: 6,042,014
[45] Date of Patent: Mar. 28, 2000

[54] METHOD FOR RECORDING AND PLAYING BACK INFORMATION ON MAGNETIC STRIPS AND RELATED READING/RECORDING APPARATUS

[76] Inventor: Giancarlo Zanetti, Via Inganni, 81 - 20147, Milan, Italy

[21] Appl. No.: 09/091,492
[22] PCT Filed: Oct. 25, 1996
[86] PCT No.: PCT/EP96/04648
   § 371 Date: Jun. 18, 1998
   § 102(e) Date: Jun. 18, 1998
[87] PCT Pub. No.: WO97/10590
   PCT Pub. Date: Mar. 20, 1997
[51] Int. Cl.[7] .................................................. G06K 19/06
[52] U.S. Cl. ........................................... 235/493; 235/449
[58] Field of Search ..................................... 235/492, 493, 235/449; 360/2

[56] References Cited

U.S. PATENT DOCUMENTS

| | | |
|---|---|---|
| 2,548,011 | 4/1951 | Frost . |
| 2,604,321 | 7/1952 | Williams . |
| 3,706,860 | 12/1972 | Burbank, III . |
| 3,761,646 | 9/1973 | Beauviala . |
| 4,266,255 | 5/1981 | Camras . |
| 4,337,375 | 6/1982 | Freeman . |
| 4,381,524 | 4/1983 | Shay et al. . |
| 4,413,289 | 11/1983 | Weaver et al. . |
| 4,425,589 | 1/1984 | Camras . |
| 4,779,145 | 10/1988 | Lemelson . |
| 4,880,963 | 11/1989 | Yamashita . |
| 5,479,512 | 12/1995 | Weiss . |

FOREIGN PATENT DOCUMENTS

| | | |
|---|---|---|
| 2 176 199 | 3/1972 | France . |
| 2176199 | 4/1972 | France . |
| 2 480 473 | 4/1980 | France . |
| 2 494 873 | 11/1980 | France . |
| 2 543 724 | 3/1983 | France . |
| 3439006 A1 | 4/1986 | Germany . |
| 60-182505 | 9/1985 | Japan . |
| 2 261 975 | 6/1993 | United Kingdom . |

OTHER PUBLICATIONS

IBM Technical Disclosure Bulletin vol. 22 No. 12 May 1980, pp. 5514–5517, Time Base Correction of Analog Recorded Signals, C.W. Coker, Jr. and K.L. Konnerth.

IBM Technical Disclosure Bulletin vol. 22 No. 2, Jul. 1979, pp 673–74, Data Encryption In a Digital Commnication System, R.W. Krug and H.B. Yin.

IBM Technical Disclosure Bulletin, vol. 22 No. 2 Jul. 1979.

*Primary Examiner*—Thien M. Le
*Attorney, Agent, or Firm*—Cowan, Liebowitz & Latman, P.C.; William H. Dippert

[57] ABSTRACT

A method for recording and playing back an audio and/or video signal and associated recording and playback apparatus, comprises: A) converting an audio and/or video signal into a first series of samples, achieved by sampling at a predetermined frequency and writing to a read/write memory (46), B) forming, by the later reading of the samples from memory at a frequency that is different from that of writing and is possibly variable, a recording on a magnetic strip (43) associated with a succession of timing marks (34) which identify recording blocks and a predetermined time T for playback of each block, C) obtaining, by reading the recording and the associated succession of timing marks, a second series of samples which are written to the memory in order, and a timing signal, D) applying the second series of samples read from the memory in an order correlated with that of writing, through a filter, to a transducer, the sampling frequency of the recording or reading of the samples from memory, which varies over time, being determined by the timing signal, in such a way that each recording block is played back in the time T.

14 Claims, 3 Drawing Sheets

METHOD FOR RECORDING AND PLAYING BACK INFORMATION ON MAGNETIC STRIPS AND RELATED READING/RECORDING APPARATUS

FIELD OF THE INVENTION

The present invention concerns a method for recording and reproduction of phonic information, and possibly also video and other information, on magnetic strips, and the related reading/writing apparatus.

BACKGROUND OF THE INVENTION

Reading/writing audio information on magnetic strip usually takes place using a tape-supporting the strip and wound on a reel and, as reading/writing means, a magnetic head positioned close to the tape which moves below it at a uniform speed, drawn by appropriate motor means which ensure the alignment of the tape below the head and the uniformity of the relative movement.

The uniformity of the movement is an essential requirement, and is a critical factor.

If this is not so the audio playback is distorted in an annoyingly noticeable manner while, conversely, errors of alignment and variations in the angular orientation of the air gap of the magnetic head with respect to the magnetic track both during recording and reading are much less noticeable on playback, translating into an attenuation of the signal read (which may largely be compensated for with systems for automatic gain control, thus controlling the volume), and a limitation of the frequency response, perceptible only to the most refined ear.

SUMMARY OF THE INVENTION

The method according to the invention enables the strip to be read/written using a suitable instrument shaped, for example, like a pen and, therefore, being of dimensions such that it can be held with one hand, provided with digital or analogue internal signal storage, and which is passed manually, and therefore at a speed that is difficult to keep uniform, over a magnetic strip which is of limited length of approximately 20–30 cm and fixed to a suitable support such as, for example, a sheet of paper, without requiring electro-mechanical instruments to move the magnetic strip.

To this end, it is provided that during the recording of the signal representing the phonic information on the magnetic strip, the signal itself is sent to the recording head, preferably following compression by a factor n, mixed or otherwise associated with a succession of time-marking pulses which define time intervals of a predetermined duration T.

The source of the signal to be recorded may be the same apparatus used for reading and playback, or it may be a different apparatus, and the time-marking pulses may, as will be seen later on, be pulses mixed with the signal, pulses recorded on a timing track parallel to the signal-recording track, or optically readable periodic markings disposed on a pre-recorded strip parallel to (or even superimposed on) the signal-recording track.

During reading, the output signal from the read head is sampled at a suitable frequency, to be determined as explained later on, and the individual samples are stored in a read write memory (following quantization if the memory is of the digital type).

According to the type and the method of associating the time-marking pulses with the signal, the marking pulses are read by the same magnetic head Which reads the signal (mixed pulses), by an additional magnetic read head, or by a section of a two-track magnetic read head (pulses recorded on a timing track), or by an optical sensor (pulses prerecorded on an optical track).

It is also possible to form a system in which the periodic time markings are "virtual", and the corresponding marking pulses are generated by an encoder instead of the optical sensor, which acts by the relative movement between the read/write apparatus and the recording support.

As will be explained later on, the marking pulses are used to determine the sampling frequency during reading or, if this is fixed and predetermined, to determine the number $N_S$ of samples between one marking pulse and the next, this series of samples being from now on called the "inter-mark sample series".

In this second case, the numbers $N_S$ relating to successive inter-mark sample series, these also advantageously being stored, are used to determine the sampling frequency, that is, the frequency of reading from the memory, which may vary between series, for use in playback.

The individual samples, if they are stored in digital form, are then reconstructed by taking the associated values coded in digital form from the memory at an appropriate reading frequency and in the same order as that in which they were stored, and sending these values to a digital-to-analogue converter.

Finally, the signal is reconstructed by passing the aforesaid reconstructed samples, or the analogue samples read from the memory, through a low-pass filter such that the original decompressed signal is available for conversion into an acoustic signal by means of a micro-loudspeaker.

Other embodiments of the invention are indicated later on in the claims.

BRIEF DESCRIPTION OF THE DRAWINGS

The features and advantages of the invention will become clearer from the following description and from the accompanying drawings of embodiments given by way of non-limitative example in which.

DETAILED DESCRIPTION OF PREFERRED EMBODIMENTS

Various embodiments are possible: the apparatus may include circuits for writing to the magnetic strip which are separate from the reading apparatus, and the reading apparatus may be formed, for example, like a pen, for reading pre-recorded tracks only, provided by a publisher as well as an associated support.

Alternatively the apparatus may include circuits for writing to and reading from magnetic strip provided, for example, in the unrecorded state by a publisher on an associated support, or applied (and to this end provided with an adhesive surface) by the user to a support in the form of annotation.

Typical applications of the method and apparatus are therefore in the production of multi-media works, for example, for studying languages, in which messages or phonic information are associated with the printed text together with the possibility of recording and playing back vocal expressions, and in the multi-media personalisation of printed texts and documents, to which the user may apply phonic annotation.

It is therefore advantageous to examine separately the aspects relating to recording the magnetic strip, and those relating to reading it.

1ST EXAMPLE OF THE RECORDING CIRCUIT

Figure 1:
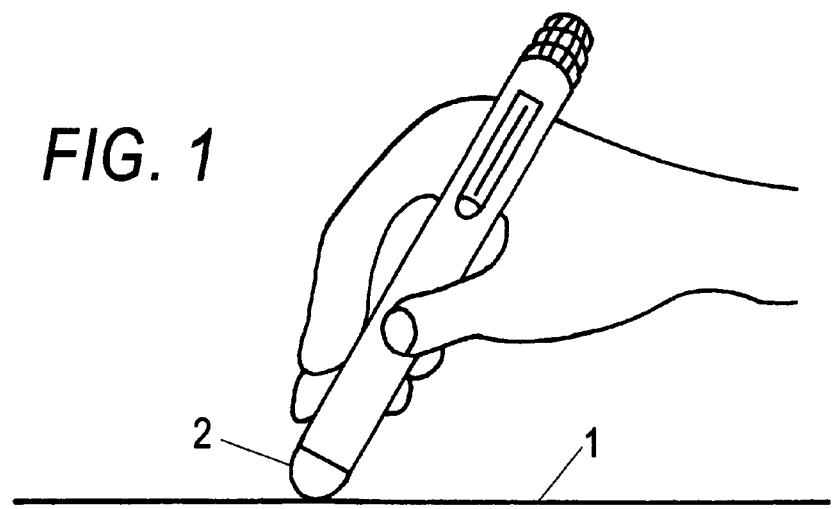
FIG. 1 is a schematic representation of a magnetic strip and the overlying write head.

With reference to FIG. 1, the recording system according to the invention provides that recording the signal on a magnetic strip 1 which is on a suitable support, for example, a sheet of paper, card or other sheet support, takes place by means of a magnetic recording head 2 which is passed over the magnetic strip from one end to the other thereof.

The head may, for example, be disposed at the end of a pen-shape instrument which can be held by a user.

It is practically impossible with an instrument of this type to ensure that the magnetic head is passed over the magnetic strip at a constant relative speed, and its repeatability during successive writing and reading operations.

However, the alignment and orientation of the head on the recording track is less critical and may be helped, if necessary, by an alignment ruler and/or by having a particular shape of the instrument tip with respect to its grip, or by disposing the strip on an edge of or close to an edge of its support, such that an edge of the strip or its support forms a guide for the alignment of the head on the magnetic strip, as is commonly seen in credit cards, badges and the like.

During sliding, the signal to be recorded which is mixed (or otherwise associated) with time marking pulses occurring at constant time intervals of value T equal, for example, to 0.2 seconds, is sent to the input circuit of the head.

Figure 2:
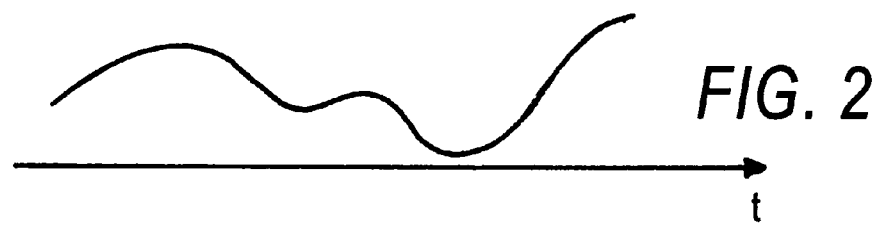
FIG. 2 is a schematic timing diagram representing the audio signal, not mixed with marking pulses, applied to the input of the write head.
Figure 3:
FIG. 3 is a timing diagram representing the marking pulses.
Figure 4:
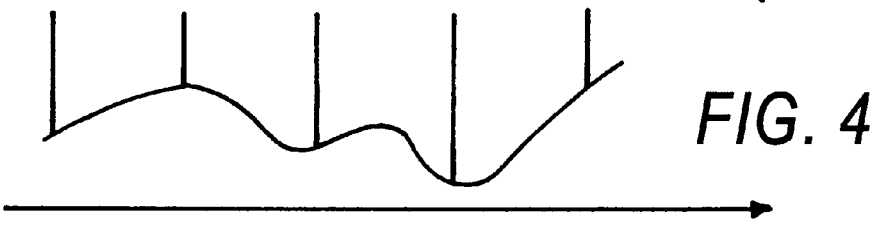
FIG. 4 is a timing diagram representing the mixed signal input to the write head.

FIG. 2, by way of example, is a timing diagram showing a part of an unmixed electroacoustic signal, FIG. 3 indicates the marking pulses, and FIG. 4 shows the signal after mixing.

After the signal has been recorded on the magnetic strip, the pattern of magnetisation along the strip itself is represented spatially as in FIG. 4, if the recording head is passed over the strip at a uniform speed (as could be the case with a mechanically moved head)

Figure 5:
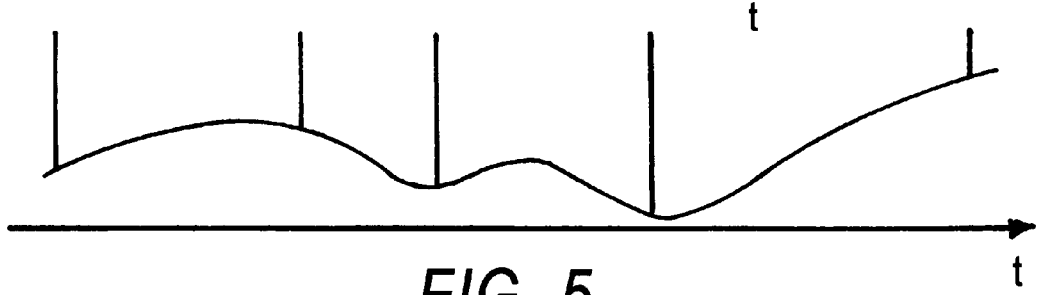
FIG. 5 represents spatially the variation in magnetisation on the strip after recording.

This pattern is, however, deformed spatially as shown, for example, in FIG. 5, if the aforesaid speed of the head varied during sliding, as could be the case with a head positioned at the end of a suitable instrument (also described as a "pen" in the following) moved manually by a user.

The benefit of the recording system described above is that the thus-recorded magnetic strip (further possible embodiments will be seen later on) lends itself to be read by manually sliding a read head of a manual instrument (which may be the same writing instrument) regardless of the sliding speed.

This instrument may have the dimensions of an ordinary stylographic pen in that the levels of miniaturisation achieved in the production of electroacoustic transducers and electronic components is such as to allow the incorporation within the pen of all the necessary components for reading the signal recorded on the magnetic strip, processing it, temporarily storing it and playing it back.

This naturally presupposes an information content of the signal input to the pen that does not exceed the storage capacity of the memory of the reading instrument (possibly also used for recording).

Components necessary for receiving a phonic signal, processing it, temporarily storing it and retransmitting it for recording on magnetic strip may also be added to the aforesaid components in the pen.

Figure 6:
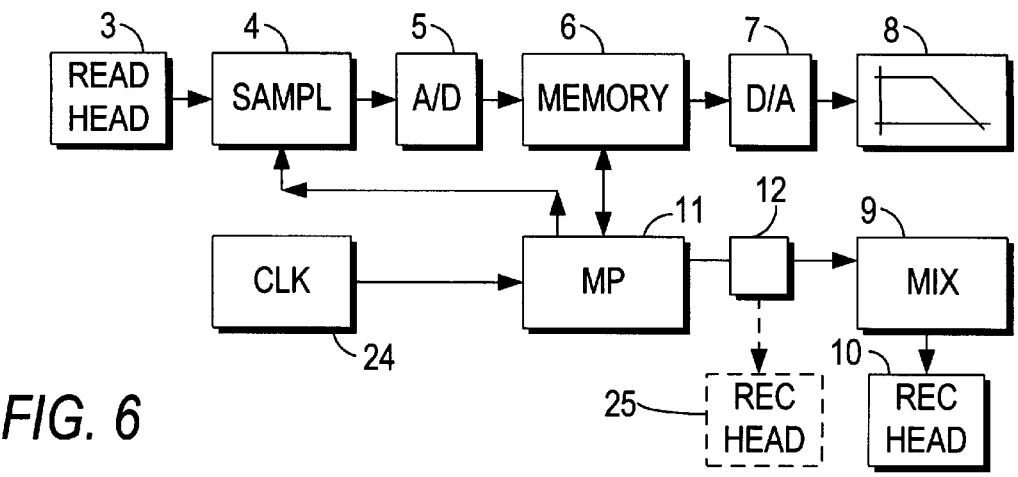
FIG. 6 is a schematic block diagram of a first embodiment of a circuit for recording on the magnetic strip.

The Circuit for Storing a Signal in a Pen and Its Subsequent Writing onto a Magnetic Strip An example of this circuit is shown in FIG. 6.

The meaning of the various blocks is as follows:

3: detector transducer (for example, a microphone);
4: sampler with a possible analogue-to-digital (A/D) converter 5;
6: memory with a possible digital-to-analogue (D/A) converter 7;
8: low-pass filter;
9: mixer;
10: magnetic write head;
11: micro-processor processing unit-;
12: marking pulse generator; and
24: clock pulse generator.

During the recording of a signal by the pen (recording may be automatic or effected by an appropriate command given by the user), the operation of the circuit may be described as follows.

The acoustic input signal to the transducer 3 in real time is translated into an electrical signal output which is sent to the sampling circuit 4 which effects the sampling thereof at a predetermined sampling frequency fc, under the control of the processing unit, timed by the clock pulse generator 24.

The samples from the sampling circuit 4 are sent to the analogue-to-digital converter 5 which converts the individual signal samples into coded numerical values in digital form.

These coded values are then stored in the memory 6 which is managed by the processing unit 11.

The availability on the market of permanent electronic memories having analogue storage as used, for example, in ordinary telephone-answering machines, means that the A/D converter 5 (and the D/A converter 7) is superfluous and necessary only if digital storage is desired.

The transfer of the signal stored in the memory 6 to the write head 10 may be described as follows:

the signal samples, stored in a digital or analogue form in the memory 6, are extracted under the control of the processing unit 11 in the same order in which they were stored in the memory and are sent, at a transmission frequency which is, for clarity of discussion, equal to the sampling frequency fc (although in practice, for reasons which will become clear, it is a multiple of a compression factor n), to the D/A convertor 7 which reconstructs the samples of the original signals.

From the output of the D/A convertor 7 (or directly from the memory if it is of analogue type), these signal samples are sent to the low-pass filter 8 which reconstructs the original signal.

The output signal from the filter is sent to the mixer 9 which, once the signal has been mixed with the marking pulses (of frequency 1/T) generated by the generator 12, sends the mixed signal to the read/record head 10.

As shown in FIG. 4, the amplitude of the marking pulses is advantageously greater than the maximum amplitude of the electroacoustic signal in order to allow discrimination between the two components of the composite signal during reading.

The operation described above applies in the theoretical case when the duration of the recording signal corresponds to the length of time that the user passes the pen over the strip, from one end to the other thereof.

If, for example, it is supposed that during recording on the strip, the user observes a maximum head sliding speed so as to ensure that the entire strip is passed over in approximately one second, this theoretical case corresponds to a duration of the recording signal of not more than 1 second.

In reality, the pre-recorded signal in the pen will normally last longer, thereby being able to achieve, for example, a value of even greater than 15 seconds.

To take account of this possibility, the processing unit 11 may be programmed in such a way as to store the entire duration of the signal in the memory 6 and consequently to vary the frequency at which the samples are extracted from the memory 6 and the frequency of the marking pulse generator when writing to the strip.

If it is supposed that the overall duration of the phonic signal stored in the memory 6 is S seconds, and the time for recording on strip RT is generally 1 second, the unit 11 will then take the samples from the memory 6 at a read frequency $f_{CR}$ equal to fc*S/RT=S*fc, and will vary the value of the frequency $f_M$ of the time marking signal generator in the same ratio, from the value 1/T to the value S/T*RT=S/T.

In this way if, for example, the duration S was 15 seconds, T was 0.2 seconds and the audio signal sampling frequency fc was 7,000 samples/sec, there would then be a new value for the marking signal frequency equal to 15/0.2=75 pulses/sec, and a value for the frequency at which the samples are extracted from the memory $f_{CR}$ equal to 7,000*15=105,000 samples/sec.

In this way, in the example given, a signal duration of 15 seconds is compressed during recording on the magnetic strip into 1 second so as to exclude possible partial loss of the signal itself.

Spatially, the recording extends practically along the entire length of the magnetic strip, regardless of the duration of the audio signal.

More simply, regardless of the duration of the audio signal, which may be assumed to be limited, as in the example given, to a maximum of 15 seconds by the capacity of the memory 6, and by providing a recording time which is not substantially different from one second, the compression factor n may be constant and equal to 15, that is, $f_{CR}$=15*fc, and the marking pulse frequency may also be constant and equal to 15/T pulses/sec.

The preceding example concerns a circuit for transcription on to a magnetic strip in which the time marking pulses are mixed with the electroacoustic signal and recorded therewith on a single magnetic track.

However, nothing prevents the time marking pulses from being recorded (without any limitation of their amplitude) on a separate timing track by utilising a double recording head of the common stereophonic head type, one section of the head being used for recording the electroacoustic signal, the other section being used for recording the timing pulses which, in this case, may also comprise a periodic signal having a relatively high frequency, equal to or correlated with the frequency $f_{RC}$=S*fc at which the signal samples are read from the memory and recorded on magnetic strip.

As will be seen later on, this allows the timing of the reading operations during the reading stage in the same way that the recording operations are timed, by means of well-known phase lock systems.

Thus, as shown in broken line in FIG. 6, as well as the write head 10, there may also be present a second head 25 (in reality, a section of the head 10, advantageously of the two-track type), which receives at its input the timing signal from the generator 12.

Although not relevant to the invention, it should be noted that an erasure head may be associated with the write head, which erasure head may alternatively be a permanent erasure or pre-erasure magnet, not necessarily disposed close to the write head (for example, if the instrument is pen-shape, at the opposite end of the instrument to that where the write head is disposed).

An embodiment will described later on as a possible variant in which the timing track, rather than being a magnetic track, is a pre-recorded optical track or even a virtual track.

In summary, the process for recording a signal takes lace in two stages:

1st. Sampling the signal in real time at a predetermined frequency fc and storing the samples in a memory. Measurement of the signal duration is optional.

2nd. Recording on the strip with time compression and a compression factor n which is fixed and predetermined (for example n=15), or a function of S (for example n=S), by reading the samples from storage at a frequency $f_{CR}$=fc*m and presenting them, through a filter, at the write head.

At the same time, a periodic time marking signal emitted at a frequency n/T, and whose period represents a time interval T, is associated with the recording.

It is therefore clear that the recording block or segment comprised in one period of the time marking signal, regardless of its length on the recording track, represents an audio signal block or segment of duration T.

1ST EXAMPLE OF THE READ CIRCUIT

Figure 7:
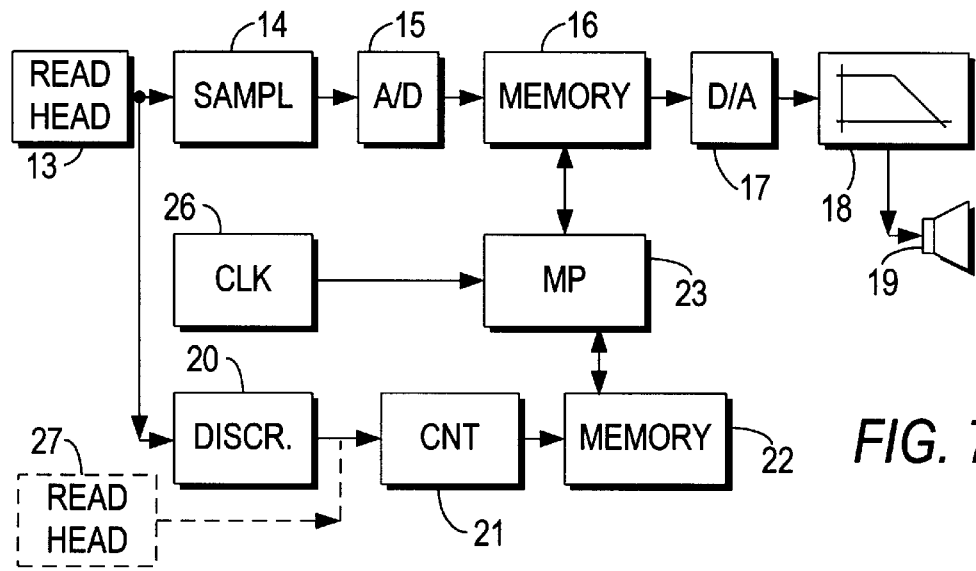
FIG. 7 is a schematic block diagram of a first embodiment of a circuit for reading the magnetic strip.

The circuit for reading the magnetic strip is shown in FIG. 7.

In FIG. 7 the various parts are identified as follows:

13: read head;
14: sampler with possible A/D converter 15;
16: memory with possible D/A converter 17;
18: low-pass filter;
19: playback transducer (micro-loudspeaker);
20: threshold circuit;
21: counter;
22: count memory;
23: processing unit;
26: clock pulse generator.

The operation of the circuit may be explained as follows:

for reading, the user (using an appropriate command to initiate reading which activates the circuit itself) passes the read head 13 of the pen over the pre-recorded magnetic strip.

In this way, an output signal is produced at the read head 13 which is sent both to the sampling circuit 14 and to the threshold circuit 20. The threshold circuit 20, on receiving the first marking pulse (or following an alternative initiation command), sends a reset/start signal to the counter 21 which starts the count with a counting speed related (equal or multiple of) to the sampling frequency of the sampler 14, which may have an arbitrary value but, preferably, has a value equal to the storage capacity, expressed as a number of storable samples divided by the maximum envisaged real time (for example, 15 seconds) of the signal to be played back.

This counting continues until another marking pulse arrives. On receiving this other pulse, another reset/start pulse is sent to the counter 21, on the arrival of which the counter unloads the result of the first count into the count memory 22, after which it resets and starts a new count.

This procedure is repeated until the last marking pulse is received.

At the same time as the above, the input signal to the sampler 14 and the samples output from the sampler itself are sent to the converter 15 which converts them into digital values which are sent to the memory 16 where they are stored.

In this way, for every series of samples taken between one marking pulse and the next ("the inter-mark sample series"), the relative number of samples taken is stored in the memory 22.

Once the signal recorded on the magnetic strip has been read, the digital values (or analogue values if the memory 16 is of analogue type) of the signal samples remain stored in the memory 16 until they are replaced by a new recording (or reset by an appropriate command).

When the user decides to playback what has been read, a playback command is sent to the circuit in FIG. 7.

On receiving this command, the unit 23 reads the first number N1 (the number of samples of the first inter-mark sample series) stored in the memory 22 and then causes the coded values to be taken from the memory 16 in the same order that they were stored therein, sending them to the converter 17 at a transmission frequency equal to N1/T, and thereby ensuring that the overall series transmission time is equal to T.

When the last coded sample value of the first series has been sent, the unit 23 reads the second number N2 (the number of samples of the second inter-mark sample series) stored in the memory 22, and causes the coded values of the second series to be taken from the memory 16 in the same order that they were stored therein, sending them to the converter 17 at a transmission frequency equal to M2/T, and ensuring that the overall transmission time of the second series also equals T.

This continues until all of the coded values in the memory 16 have been read.

During the reading of the samples from the memory 16, the circuit downstream of the memory operates as follows.

Each sample received by the converter 17 is converted into an analogue signal and transmitted to the low-pass filter 18.

The output signal from this filter is the reconstruction of the original signal, and is sent to the transducer 19 in the pen, which allows the signal itself to be played back.

The operation and the structure of the read circuit are very similar when the time marking pulses are recorded on a timing track, separate from the signal track.

In this case, the threshold discriminator circuit 20 of FIG. 7 is superfluous, and a second read head represented in broken line in FIG. 7 and identified 27 supplies the marking pulses to the counter 21.

In both of the cases described above, the reading of the magnetic recording and its temporary storage in memory occur with sampling at an arbitrary frequency: the time correction occurs in the subsequent playback stage due to the time information provided by the marking pulses which must themselves be stored in the memory 22 (FIG. 7) for subsequent use during playback.

An even simpler read circuit can, however, be conceived if the time marking signal, which is associated spatially with the signal recording, is a periodic spatial signal representing a period equal to or a predetermined multiple of the sampling period 1/fc (used during the storage stage preceeding recording), naturally being recorded with the same compression factor used for recording the phonic signal.

A multiple of approximately 4–8 times 1/fc corresponding to a frequency of 1–2 KHz is preferred in order to ensure that the signal is recognised even in the presence of orientation errors of the read head with respect to the track.

Figure 8:
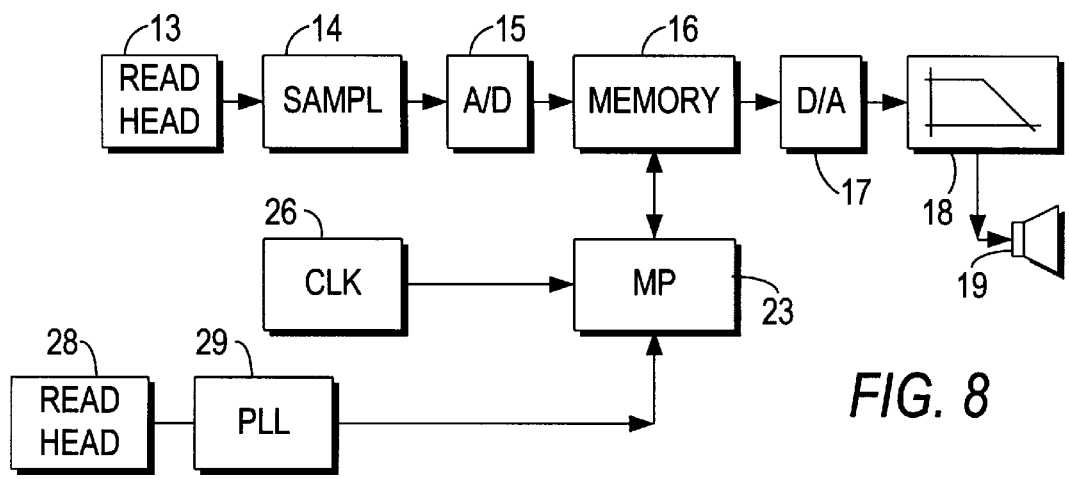
FIG. 8 is a schematic block diagram of a second embodiment of a circuit for reading the magnetic strip.

In this case, as shown in FIG. 8 in which the elements identified 13 to 19 and 23, 26 correspond to the elements of FIG. 7 identified by the same numerals, a read head 28 reads the periodic timing signal and applies it to a frequency multiplier circuit 29, for example, a phase lock loop PLL, which outputs a periodic pulse signal representing a frequency that is a predetermined multiple of that of the timing signal and equal to the sampling frequency fc.

The output signal from the PLL 29 is used to control, at the same frequency, directly or through the processor 23, the sampling circuit 14 and writing to the memory 16.

In this case, instead of correcting the signal recorded in the memory 16 during the subsequent playback stage, the signal for reading the magnetic recording is sampled at the appropriate period to correct, with negligible error, for each spatial position of the magnetic strip, the differences in the relative speeds of the strip and the head which arise during the recording stage and the subsequent reading stage.

If the timing signal output by the head 28 itself represents the sampling period 1/fc, the phase-locking circuit is superfluous.

In summary, the process of playing back the signal recorded on magnetic strip takes place, in the various examples given, like that of recording, in two stages:

1st. reading the magnetic recording, sampling it at an appropriate frequency and storing the samples in a memory.

2nd. subsequently reading the memory at an appropriate frequency and, at the same frequency, presenting the information read, converted into an analogue form if necessary, and filtered, to a transducer (loudspeaker).

The sampling frequency in one of the two stages is defined by time markings associated with the magnetic recording which are read during the first stage, and which may also be stored in order to define the sampling frequency, which may vary over time, to be used during the second stage.

2ND EXAMPLE OF THE AUDIO RECORDING AND PLAYBACK CIRCUIT

Instead of a circuit diagram detailing the various constructional blocks represented in FIGS. 6, 7, 8 which, to the expert in the field, once the problem and its solution has been defined, are obvious in terms of the constructional detail (and are also commercially available) it is appropriate to describe an embodiment of the system in accordance with the present invention which uses, for timing the relationship between the recording and playback operations, a prerecorded timing track separate from that for recording the audio signal.

The pre-recording, which is done once only, may be of the magnetic type and readable by a magnetic head but, in order to avoid the risk of unwanted erasure or amendments caused by the misalignment of the recording head during subsequent recording operations, it is preferably optical and comprises a succession of equidistant parallel tracks which are printed or otherwise formed along an optically readable track parallel to (or superimposed on) the magnetic recording track.

The spatial interval between two successive sections defines a recording field of the magnetic strip within which a predetermined time interval for the electroacoustic signal is allocated, regardless of the relative movement speed of the strip and the head, during recordal and playback.

During recording, the optical track is read and provides the recording apparatus with a periodic signal having a frequency fo which varies as a function of the relative movement speed.

This signal is used by the recording apparatus to control the frequency at which the various samples of the audio signal that are stored in the memory are extracted from the memory and presented at the recording head.

In this way, a block or segment of audio signal of predetermined and constant duration is recorded in every spatial interval or field of the magnetic strip.

The same periodic signal of variable frequency fo, obtained by reading the pre-recorded track, is used by the apparatus when reading the magnetic strip for controlling the frequency at which the read signal is sampled and stored.

Playback occurs by reading the memory and extracting the samples at a predetermined and constant frequency equal to that used by the recording apparatus for storing the audio signal.

In other words, during recording and by virtue of the preliminary storage of the audio signal, this occurs with a normalisation of the spatial scale which corrects possible variations in the relative movement speed and, while reading the recording, storage occurs with a normalisation of the time scale which corrects possible differences or variations in the relative movement speed with respect to the recording operation, such that subsequent playback may be achieved by extracting the stored signal samples from the memory at a constant frequency.

Figure 9:
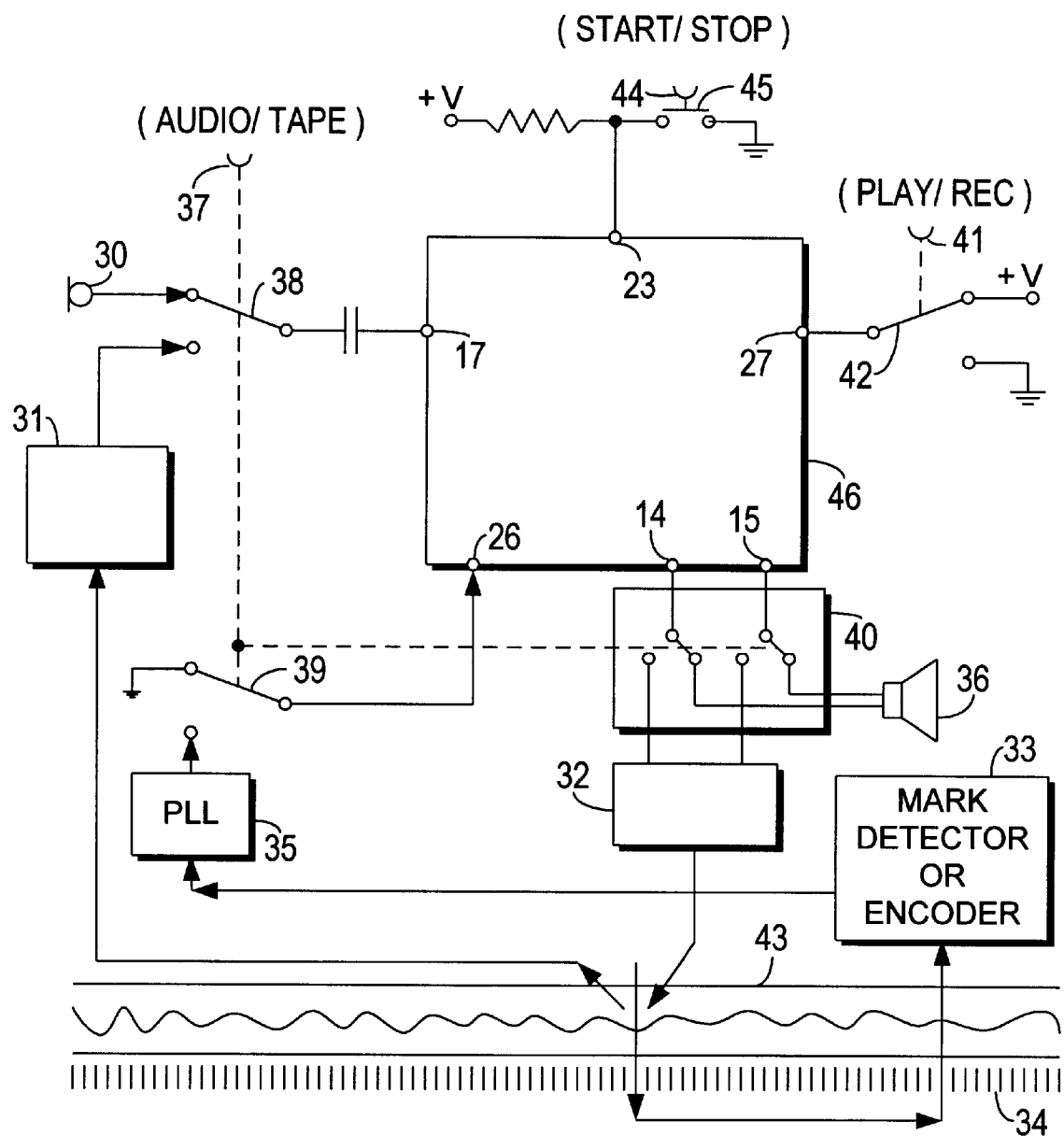
FIG. 9 is a schematic block diagram of a second embodiment of a recording and playback circuit, which uses a pre-recorded timing track separate from that for recording.

FIG. 9 is a schematic block representation of an audio recording and playback system which implements the aforesaid concept with the use of very few components.

The system includes:
microphone (MIC) 30;
magnetic read head (READ HEAD) 31;
magnetic write head (WRITE HEAD) 32;
sensor 33, preferably optical (MARK DETECT), for reading a timing track 34 associated with the recording strip 43;
phase locked frequency multiplier circuit (PLL) 35;
micro-loudspeaker 36;
first bistable push button (AUDIO/TAPE) 37 for actuating two switches 38, 39 and a two pole switch 40;
second bistable push button (PLAY/REC) 41 for actuating a switch 42;
third push button (START/STOP) 44 for actuating a switch 45; and
an integrated circuit 46 of the type sold by the firm ISD under the code number ISD25XX, advantageously modified, which performs all the functions of sampling, storing and playing back an audio signal.

Without going into the constructional and functional details of the integrated circuit 46, which are not essential for understanding the invention, and for which reference may be made to the technical details of the producer (ISD2500 Series: Single Chip Voice Recorder/Playback Devices—45-60-75 and 90 seconds durations—Preliminary data sheet, 1993), it should be noted only that the circuit, supplied with a voltage of +5V, is provided with the following input/output and control terminals, for which the following numbering is used by the producer:
pin 17: input for the signal to be stored, generally provided by a microphone (or telephone line);
pins 14, 15: output for the stored signal to an external loudspeaker;
pin 27: to connect to earth or a positive voltage selectively. A positive voltage applied to pin 27 puts the circuit in the operational mode for reproduction (PLAY). When pin 27 is earthed, the circuit is in the operational mode for recording, or rather, storage, so as not to confuse this operation with the recording on magnetic tape.
pin 26 (XCLK) input for an external timing signal. If not used it must be earthed.
pin 23 (CE) : to connect to earth or a positive voltage selectively. When pin 23 is earthed, the integrated circuit is enabled for operation. When pin 23 is connected to a positive voltage, the circuit is unable to operate.

The integrated circuit 46 includes an internal clock generator, non-volatile internal storage for analogue samples, an input amplifier with automatic gain control, an output amplifier, sample and hold circuits for the input/output storage, active input and output filters, and logic control circuits.

The integrated circuit, controlled by the pins 23 and 27, is able to store a signal received from a microphone (or telephone line) and subsequently to play it back using a loud speaker.

Therefore the integrated circuit may perform, in known manner, the functions of telephone answering machines and electronic notes, having a storage capacity that, according to the model and the sampling frequency used, may reach 120 seconds.

The commercially-available integrated circuit is intended to operate at a predetermined audio signal sampling frequency, imposed by the internal clock signal generator or by an external clock signal applied to the pin 26 (XCLK)

This is because the internal filters are optimised for a predetermined operating frequency, and the applications foreseen by the producer do not require operation at variable frequencies.

However, nothing prevents the characteristic of the filters from being altered to enable the circuit to work at frequencies which vary between wide limits, without problems of "aliasing", optimising it for use in the system which is the subject of the present invention.

As shown in FIG. 9, the sensor/reader of the timing track is connected to the PLL 35 so as to provide it with a periodic time marking signal having a frequency fo which varies as a function of the variation in the relative speed, and arising from reading the timing track.

The PLL 35 generates a signal having a variable frequency fn=K*fo which is a multiple by a predetermined factor K of the frequency fo.

This signal is applied via the switch 39 to the terminal 26 of the circuit 46 when the bistable button 37 is put in the TAPE position.

When the button 37 is in this position, the output of the read head 31 is connected to the input 17 of the circuit 46, and the inputs of the write head 32 are connected to the outputs 14, 15 of the circuit 46.

When the button 37 is in the AUDIO position, the microphone 30 is connected to the input 17 and the read head 31 is disconnected, the PLL 35 is disconnected from the input XCLK 26 which is earthed, and the outputs 14, 15 of the circuit 46 are connected to the loudspeaker 36, while the read head 32 is disconnected.

Pressing the button 44 (START/STOP) earths the control terminal 23, which is normally at a positive voltage, and activates the integrated circuit 46.

When the bistable button 41 (PLAY/REC) is in the PLAY position, the terminal 27 is connected to the positive voltage +V which controls the playback mode of the integrated circuit 46 and, when it is in the REC position, the terminal 27 is earthed, imposing the operative mode of storage in the memory.

The operation of the system shown in FIG. 9 is immediately understandable.

1st. In order to store an audio signal in the circuit 46, the button 37 is pressed to the AUDIO position, the button 41 is pressed to the REC position, and the button 44 is held down for the entire duration of the audio signal to be stored (not greater than the maximum storable time).

The audio signal is then sampled at a frequency fc imposed by the internal clock signal of the integrated circuit 46, and the samples are stored in the memory.

The loudspeaker 36, even if it is connected to the outputs 14, 15, is not powered, and both the read head 31 and the write head 32, as well as the PLL 35, are disconnected from the integrated circuit.

2nd In order to record the signal stored in the integrated circuit 46 on magnetic tape, the button 37 is pressed to the TAPE position and the button 41 is pressed to the PLAY position.

The write head 32 is then connected to the outputs 14, 15, and the output of the PLL is connected to the input 26.

The read head 31 is also connected to the input 17, but this has no effect.

Pressing the button 44 activates the integrated circuit 46 and, at the same time, the head 32 and the sensor 33 may be manually passed over the magnetic tape 43 and the associated timing track respectively.

After a short series of timing pulses has been received by the sensor 33, the PLL phase locks the signal received and starts to emit the signal of frequency fn=K*f0, proportional to the speed of the head 32 and the sensor 33.

The circuit 46 reads the stored signal samples from memory at a frequency fn, and presents them as input to the write head 32.

The factor K is advantageously chosen so as to compress a signal time interval of unitary duration onto a track of the tape of predetermined length L, for example 2 cm (the length which expectedly is run in a short time interval of approximately 0.1 seconds), as is easy to verify using the formula K=fc*P/L.

In fact, the speed, measured by the sensor 33, is given by v=T*fo, the time t necessary to cross the space L is given by t=L/v, and the sampling frequency necessary to compress fc samples in the time t is given by fn=fc/t, from which fn=fc/t=fc*v/L=fc*P*fo/L.

Therefore, if fc=8 KHz (in order to obtain a frequency response extended to approximately 3 KHz), P=0.2 mm (the lower limit for usual printing technology), and L=2 cm, K will be equal to 80 and, for example, for a manual displacement speed of approximately 10 cm/sec, fo=500 Hz and fn=40 KHz.

3rd. To read the thus-recorded magnetic tape, the button 37 is pressed to the TAPE position to connect the read head 31 and the PLL 35 to the integrated circuit, and the button 41 is pressed to the REC position to control the circuit 46 during recording, which is activated by the closure of the switch 45.

By passing the head 31 over the magnetic tape and the sensor 33 over the timing track, the PLL 35 phase locks the signal of frequency fo emitted by the sensor 33, and controls the sampling and storage of the signal emitted by the read head at a frequency fn=Kfo.

4th. To playback the recording stored in the integrated circuit 46, it is sufficient to press the button 37 to the AUDIO position and the button 41 to the PLAY position.

This disconnects the PLL 35 from the circuit 46 and connects the loudspeaker.

Closing the switch 45, by means of the button 44, activates the circuit 46, its memory is read at the reading frequency fc imposed by the internal clock signal, and the stored information is accurately played back.

It is clear that the system of FIG. 9 is a complete recording and playback system: if it is desired to produce apparatus which only plays back pre-recorded magnetic tapes, the microphone 30 and the associated switch 38 are superfluous, as is the read head and the associated switch 40.

However, the complete version shown in FIG. 9 is preferable as it offers the possibility of recording as well as using the apparatus as a conventional electronic note.

It is also clear that numerous variants are possible.

In particular, the read head and the recording head, shown for clarity as being separate and, preferably, being separate in reality (such that the written track is wider than the read track to allow sideways movements with respect to the heads during the two stages of recording and reading), may also comprise a single head which alternatively takes on the role of the write head and that of the read head and which, to this end, is alternatively connected to the outputs 14, 15 of the integrated circuit 46 and to its input 17.

The PLL frequency multiplier 35, which has negative feedback, may also be replaced by a different type of variable frequency generator.

Figure 10:
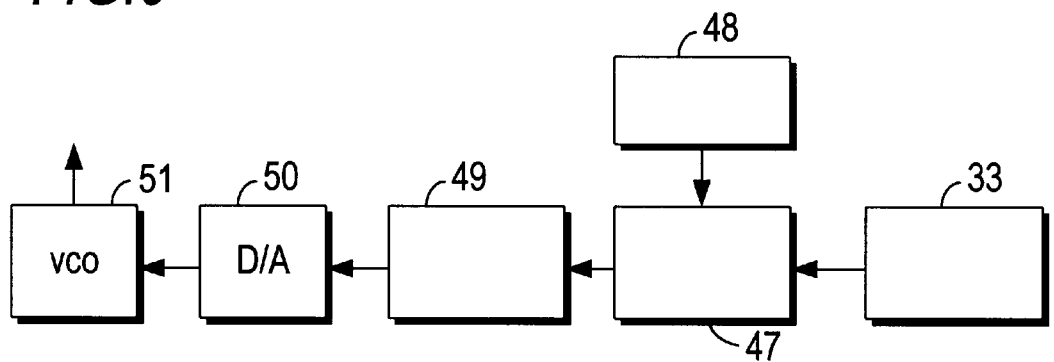
FIG. 10 is a schematic block diagram of a variant of the sampling frequency generator for the circuit of FIG. 9.

For example, as shown in FIG. 10, the timing markings detector 33 may send, on recognising each marking, a reset/start signal to a digital counter 47 which increments on receiving each clock pulse generated by an oscillator 48 of predetermined and constant frequency.

On receiving successive reset/start pulses, the counter 47 charges an output register 49 which maintains the count value until the following reset/start operation of the counter.

The information stored in the register 49 is converted by a D/A converter 50 into an analogue voltage signal which is input to a voltage-controlled oscillator 51, commonly known by the acronym VCO, which outputs a timing signal having a period proportional to the input voltage, and therefore to the period between two successive marking pulses.

The signal is used during recording to control the frequency at which samples are extracted from the memory and their presentation at the write head through a filter. During the reading of the recording, this signal is used to control the read sampling frequency and the memory rite frequency.

With a circuit of this type, the duration of an inter-mark interval determines the sampling frequency in the subsequent inter-mark interval, and is clearly unable to determine the sampling frequency in the same interval. However, if, as is seen in practice, the variations in the relative speed of displacement between one inter-mark interval and the next are modest (and, to this end, it is appropriate that the inter-mark interval is as small as possible), the error which arises is negligible.

As a further variant, there can be provided playback and/or recording apparatus which reads a timing track having "virtual" markings:

the mark sensor 33 shown in FIGS. 9 and 10, instead of being optical, may be an encoder activated by a roller passing over the recording track which encoder itself generates mark pulses correlated to predetermined spatial intervals along the track. The optical solution is, however, preferred due to its lower cost and smaller size.

It is then clear that other functions may be added to the recording and/or playback equipment.

For example, the audio signal may be recorded in cryptographic form, which is extremely easy to achieve by extracting the samples stored in the memory in a predetermined cyclic order or "key" which is different from that of storage, and playback can correctly occur by virtue of the preliminary storage of samples of the recorded signal which are read in the same order as recording and subsequent reading of the memory, and presenting at the playback device in a reverse cyclic order to that used for the cryptography.

The recorded message can only be reproduced correctly if the user is in possession of the cyclic key. The preceding description concerns recording and playing back audio signals.

It is, however, clear that the concepts described above apply equally to recording and playing back video signals, representing moving rather than just static images even if, given the current state of commercially-available technology, the capacity for storing and recording on a magnetic tape or strip of a length restricted to just a few tens of centimeters is limited.

Other functions may be added to this: for example, the apparatus may be provided with a head for reading printed images, such as a conventional scanner, which are stored in the internal memory and then recorded on magnetic strip, to be reproduced later on as images by means of the possible connection of the apparatus to external apparatus, such as a printer or monitor.

I claim:

1. Apparatus for playing back an audio and/or video signal in the form of a recording on magnetic strip laid down on a support, a succession of timing marks spaced along said strip being associated with this recording, which timing marks define recording blocks between successive marks and a predetermined time interval T for playing back each of said blocks, including:

read means which are manually movable with respect to said magnetic strip for reading said recording and said succession of timing marks and generating a first read signal of said recording and a second periodic read signal of said succession of marks;

a memory periodically write controlled in a first stage for storing an ordered succession of samples of said first signal, and periodically read controlled in a second subsequent stage for reading said stored samples in an order correlated with that of writing;

reproduction means connected to said memory for receiving said signal samples, read from said memory and for converting them into an acoustic and/or video signal; and timing and control means connected to said read means for receiving said second read signal, and connected to said memory for writing said memory during said first stage, for reading said memory during said second stage and for variably controlling, in time and as a function of said second periodic signal, one of the two following frequencies:

A) the frequency of said periodic writing to memory,
   B) the frequency of said periodic reading of the memory in such a way that, in A), a number of samples representing a recording block is stored during a period of said second signal and, in B), a number of samples representing a recording block is read during said predetermined time interval T.

2. Playback apparatus as in claim 1, also for recording an audio and/or video signal on magnetic strip, further including:

a transducer for transducing sounds and/or images into an electrical signal, sampling means controlled by said timing and control means, and connected to said transducer and said memory for inputting and writing an ordered succession of samples of said electrical signal to said memory at a controlled frequency fc during a third stage, a magnetic write head which is manually moveable with respect to said magnetic strip, and which is connected to said memory for receiving, through a filter, from said memory, periodically controlled to read during a fourth stage subsequent to said third stage by said timing and control means, a recording signal formed from said electrical signal samples, and effecting their recording on said strip, and means for associating said succession of timing marks with said recording, said succession of timing marks being either prerecorded on said strip, read during said fourth stage and provided to said timing and control means for controlling the frequency of said memory periodical reading, or being generated by said timing and control means at a frequency for higher than said frequency fc.

3. Playback apparatus as in claim 1, in which said timing marks are mixed with said recording on said magnetic strip, and said read means include a magnetic head for reading said recording, and means for discriminating said timing marks.

4. Playback apparatus as in claim 1, in which said timing marks are recorded on a magnetic timing track separate from said recording, and said read means include a first magnetic head for reading said recording, and a second magnetic head for reading said timing track.

5. Playback apparatus as in claim 1, in which the said timing marks are disposed on an optical track associated with said magnetic strip, and said read means include a magnetic head for reading said recording and an optical sensor for reading said optical track.

6. Playback apparatus as in claim 1, in which said timing marks are virtual marks of a virtual timing track associated to said magnetic strip on said support, and said read means include a magnetic head for reading said recording, and an encoder which generates timing pulses corresponding to said timing marks by relative movement of said apparatus and said magnetic strip.

7. Playback apparatus as in claim 1, in which said apparatus is pen-shaped.

8. Playback apparatus as in claim 1, in which said timing and control means include a frequency multiplier circuit connected to said read means for receiving said second periodic reading signal and for generating a timing signal having a frequency that is a predetermined multiple of that of said second periodic reading signal of said marks.

9. A method for the reproducible recording of an audio and/or video signal on magnetic strip at a non-uniform relative speed between a write head and said strip comprising the following steps:

storing an ordered succession of samples of said signal, sampled at a predetermined constant frequency fc, during a first stage, reading in an order correlated to that of storage and at a frequency far higher than said frequency fc, during a second stage subsequent to said first stage, said samples and inputting them, through a filter, to said write head so as to record said signal on said strip, and associating a succession of timing marks with said recording, the timing marks being spaced along said strip and defining recording blocks between successive marks and a predetermined time interval T for playing back each of said blocks.

10. A method for playing back an audio and/or video signal recorded on magnetic strip, a succession of timing marks spaced along said strip being associated with the recording, which timing marks define recording blocks and a predetermined time interval T for playing back each of said blocks, including the following steps:

in a first stage reading said magnetic strip and said succession of timing marks in unison, obtaining a read signal and a periodic timing signal respectively, periodically writing to a read/write memory at a first access frequency, in an ordered fashion, successive samples of said read signal effected at said first frequency, and then in a second stage subsequent to said first stage, periodically reading from said memory, at a second access frequency lower than said first access frequency, in an ordered way correlated with that of writing, said stored samples and presenting said read samples to a transducer, through a filter, the access frequency being predetermined in one of the said two periodic memory-access steps, writing and then reading, the access frequency in the other of the said two steps being based on the said periodic timing signal, such that each succession of samples representing a recording block is read and played back in said predetermined playback time interval T.

11. Playback apparatus as in claim 2, in which said timing marks are mixed with said recording on said magnetic strip, and said read means include a magnetic head for reading said recording, and means for discriminating said timing marks.

12. Playback apparatus as in claim 2, in which said timing marks are recorded on a magnetic timing track separate from said recording, and said read means include a first magnetic head for reading said recording, and a second magnetic head for reading said timing track.

13. Playback apparatus as in claim 2, in which the said timing marks are disposed on an optical track associated with said magnetic strip, and said read means include a magnetic head for reading said recording and an optical sensor for reading said optical track.

14. Playback apparatus as in claim 2, in which said timing marks are virtual marks of a virtual timing track associated to said magnetic strip on said support, and said read means include a magnetic head for reading said recording, and an encoder which generates timing pulses by corresponding to said timing marks by relative movement of said apparatus and said magnetic strip.

* * * * *